United States Patent
Brown et al.

(10) Patent No.: US 6,554,105 B2
(45) Date of Patent: Apr. 29, 2003

(54) CONVEYOR SYSTEM WITH STABILIZED CARRIER

(75) Inventors: Michael E. Brown, Kings Mills, OH (US); Michael J. Craven, Sycamore Township, OH (US)

(73) Assignee: E. F. Bavis & Associates, Inc., Maineville, OH (US)

(*) Notice: Subject to any disclaimer, the term of this patent is extended or adjusted under 35 U.S.C. 154(b) by 49 days.

(21) Appl. No.: 09/776,808

(22) Filed: Feb. 5, 2001

(65) Prior Publication Data

US 2002/0104713 A1 Aug. 8, 2002

(51) Int. Cl.$^7$ ................................................ E04H 3/04
(52) U.S. Cl. .......................................... 186/41; 186/58
(58) Field of Search ............................ 186/14, 22, 26, 186/37, 53, 58; 198/711, 712, 701, 468.6, 797, 466.1; 414/222.05, 226.04

(56) References Cited

U.S. PATENT DOCUMENTS

| | | | |
|---|---|---|---|
| 4,010,824 A | 3/1977 | Bavis | 186/1 C |
| 4,311,211 A * | 1/1982 | Benjamin et al. | 104/302 |
| 4,712,650 A * | 12/1987 | Campbell | 186/41 |
| 4,722,433 A * | 2/1988 | Gough | 198/706 |
| 4,770,287 A * | 9/1988 | Glowatzki | 198/706 |
| 4,957,188 A | 9/1990 | Bavis | 186/41 |
| D315,412 S | 3/1991 | Bavis | D25/52 |
| D319,701 S | 9/1991 | Bavis | D25/52 |
| 5,054,605 A | 10/1991 | Bavis | 198/750 |
| 5,058,729 A * | 10/1991 | Shibata | 198/712 |
| 5,113,970 A | 5/1992 | Bavis | 186/41 |
| 5,232,408 A | 8/1993 | Brown | 474/140 |
| 5,526,921 A * | 6/1996 | Kovalak et al. | 198/706 |

FOREIGN PATENT DOCUMENTS

| | | | | |
|---|---|---|---|---|
| EP | 0 377 710 A1 | * | 10/1989 | B65G/47/40 |
| JP | 63-82208 A | * | 4/1988 | B65G/17/48 |

* cited by examiner

*Primary Examiner*—Donald P. Walsh
*Assistant Examiner*—Mark J. Beauchaine
(74) *Attorney, Agent, or Firm*—Dinsmore & Shohl LLP (57) ABSTRACT

A conveyor system for delivering items between a processing station and a remote delivery station includes a pair of flexible drive members and a pair of spaced apart drive guides each positioned to define a path of travel for one of the drive members between the stations. A carrier member having an item receiving portion and upper and lower ends is attached to both of the flexible drive members adjacent one of its upper or lower ends for reciprocation between the stations along the guides. A third flexible stabilization drive member and a corresponding stabilization guide is positioned to define a third path for the stabilization drive member. The carrier member is attached to the stabilization drive member adjacent to the other of its upper or lower ends. The active stabilization guide member provides for more uniform and stable translation of the carrier member between the stations. The invention also provides an adjustable mount connecting the stabilization drive member to the carrier member, and which allows for automatic adjustment of the predetermined spacing between the carrier journal for one or more of the drive members and the stabilization journal for the stabilization drive member, further enhancing stabilization of the system and maintenance of the carrier member in a desired orientation between the stations.

32 Claims, 6 Drawing Sheets

CONVEYOR SYSTEM WITH STABILIZED CARRIER

TECHNICAL FIELD

This invention relates to conveyor systems of the type used in drive-up facilities such as restaurants, banks, pharmacies and similar drive-in service arrangements, wherein a carrier is utilized to convey items from a processing station to a remote delivery or transaction station. The present invention also provides an active stabilization system for the carrier which enables maintenance of the carrier in a preferred orientation throughout delivery procedures.

BACKGROUND ART

Various types of conveyor systems have been utilized in drive-up service facilities such as remote drive-up stations for restaurants and the like, such as shown and described U.S. Pat. Nos. 4,957,188 and 5,113,970 (which issued to Edward F. Bavis), both of the aforesaid patents being hereby incorporated herein by reference. In its simplest form, such a conveyor system provides a processing station adjacent to the service facility such as a restaurant order station or kitchen, a pharmacy desk, or a bank teller station, at which a customer's order is filled and then transported to one or more delivery or transaction stations remote from the processing station. The items, such as food products, drinks, banking documentation, prescriptions or the like, are conveyed from the processing station to the remote delivery or transaction station by means of a conveyor system having a basket-like carrier which generally transports the items through a housing or portion of the building which can extend around and over other objects or spaces by means of vertical and horizontal conveyor sections. For example, a drive-through restaurant delivery process might entail delivering food products, drinks, change, utensils and the like from a processing station adjacent to the restaurant kitchen, vertically upwardly and then horizontally through a canopy overlying one or more drive-in lanes, and then vertically downwardly to a delivery station arranged for presentation to or access by the customer.

During its travel between the processing station and the delivery station, the basket-like carrier must be maintained in a generally upright position to ensure that the items in the basket will not be spilled or overturned. As set forth in U.S. Pat. No. 4,957,188, the carrier basket might be suspended between an opposing pair of spaced apart drive members which might include conveyor chains, drive belts or flexible drive tapes. The carrier basket in that patent was pivotally mounted relative to the drive members so as to retain its generally upright position regardless of whether the direction of movement was horizontal or vertical. The '181 patent further controlled rocking movement that could otherwise adversely affect the performance of such a conveyor system and/or cause tipping or spillage of contents from the basket during delivery cycles by the provision of supplementary guide members positioned so as to be contacted by a guide roller to provide control to the carrier basket during translation. Such guide members would be designed and adjusted to accommodate peculiarities of the system such as related to speed, guide track conformation and design, nature of the items being transported and the like.

With increasing demands for shortened transaction times, reduced transport cycle times, and with expanded applications of conveyor systems utilizing carrier members for delivery of various products to remote delivery stations, there has been a growing need for conveyor systems which can accommodate a wide variety of speeds while maintaining the carrier in a predetermined orientation and/or minimizing the rocking movement and other extraneous movements of or forces on the carrier which could cause undesirable tipping, rocking or other disturbance of the contents and items to be delivered. It has also been a desire of the industry to have access to conveyor systems which can accommodate higher speeds of carrier translation without a need for modification of the system or adjustment or "tuning" of deflectors or other passive stabilization structures, and which maintain relatively uniform and reliable performance over the service life of the conveyor system. It has also been desirable to provide a conveyor system utilizing flexible drive members or tapes, wherein improved tolerance for variations of the tape structures themselves, as well as variations among different drive tapes, in order to simplify the manufacture, assembly, operation and maintenance of such conveyor systems in a reliable and consistent manner.

SUMMARY OF THE INVENTION

In accordance with the invention, a conveyor system for delivering items from a possessing station to a remote delivery station is provided, wherein a pair of spaced apart drive guides are positioned to define a path of travel for each of a pair of flexible drive members between a processing station and remote delivery station. A carrier member having an item receiving portion is attached to each of the respective flexible drive members adjacent one of its upper or lower ends for reciprocation between the stations along the guides. A third flexible stabilization drive member and a corresponding stabilization guide is positioned to define a third path of travel for the stabilization drive member, which is attached to the carrier member adjacent the other of the upper or lower ends.

In one embodiment of the invention, the conveyor system is also provided with an adjustable mount for connecting the stabilization drive member to the carrier member. In another embodiment, that adjustable mount is adapted to allow for limited movement in use of the connection between the third drive member and the carrier member. As will be described below, the carrier is connected to the stabilization drive member at a predetermined spacing or distance from the connection between at least one of the drive members and the carrier. In one embodiment, the adjustable mount is adapted to automatically allow variation as needed of the spacing between the connections of the carrier to the stabilization drive member and at least one of the other drive members in order to maintain the carrier in an optimally stable condition.

In another embodiment, the adjustable mount is adapted to allow movement in only the direction of the spacing between respective connections of the stabilization drive member and a corresponding carrier drive member in use. In yet another embodiment, at least one power drive is provided to reciprocate the two drive members and the stabilization drive member simultaneously. The power drive can be adapted to drive all drive members synchronously.

It is also contemplated that the power drive can comprise a reversible drive assembly having a drive shaft and a plurality of driving members each in driven communication with the drive shaft and one of the flexible drive members. In another embodiment, that same reversible drive assembly can include a driven member in driven communication with the drive shaft and the stabilization drive member, such that both of the flexible drive members and the stabilization drive member are powered by a single power source.

By providing a power driven third flexible stabilization drive member, the carrier member is positively and actively maintained in a stable relationship corresponding with the flexible drive members reciprocating the carrier member between the stations. Moreover, with the adjustable mount connecting the stabilization drive member to the carrier member, the conveyor system automatically accommodates variations among the drive members, guide tracks, drive members and connections the carrier member regardless of speed of travel or direction of translation of the carrier member along the conveyor system.

While the invention will be described in conjunction with examples of conveyor systems utilizing a flexible yet relatively longitudinally rigid perforated tape as drive members, it should be understood that the invention is equally applicable to conveyor systems wherein the carrier member is conveyed via other means such as a chain, gear belt, cable or the like.

BRIEF DESCRIPTION OF THE DRAWINGS

While the specification concludes with claims particularly pointing out and distinctly claiming the present invention, it is believed the same will be better understood from the follow description taken in conjunction with the accompanying drawings in which:

DETAILED DESCRIPTION OF EXEMPLARY EMBODIMENTS

Figure 1:
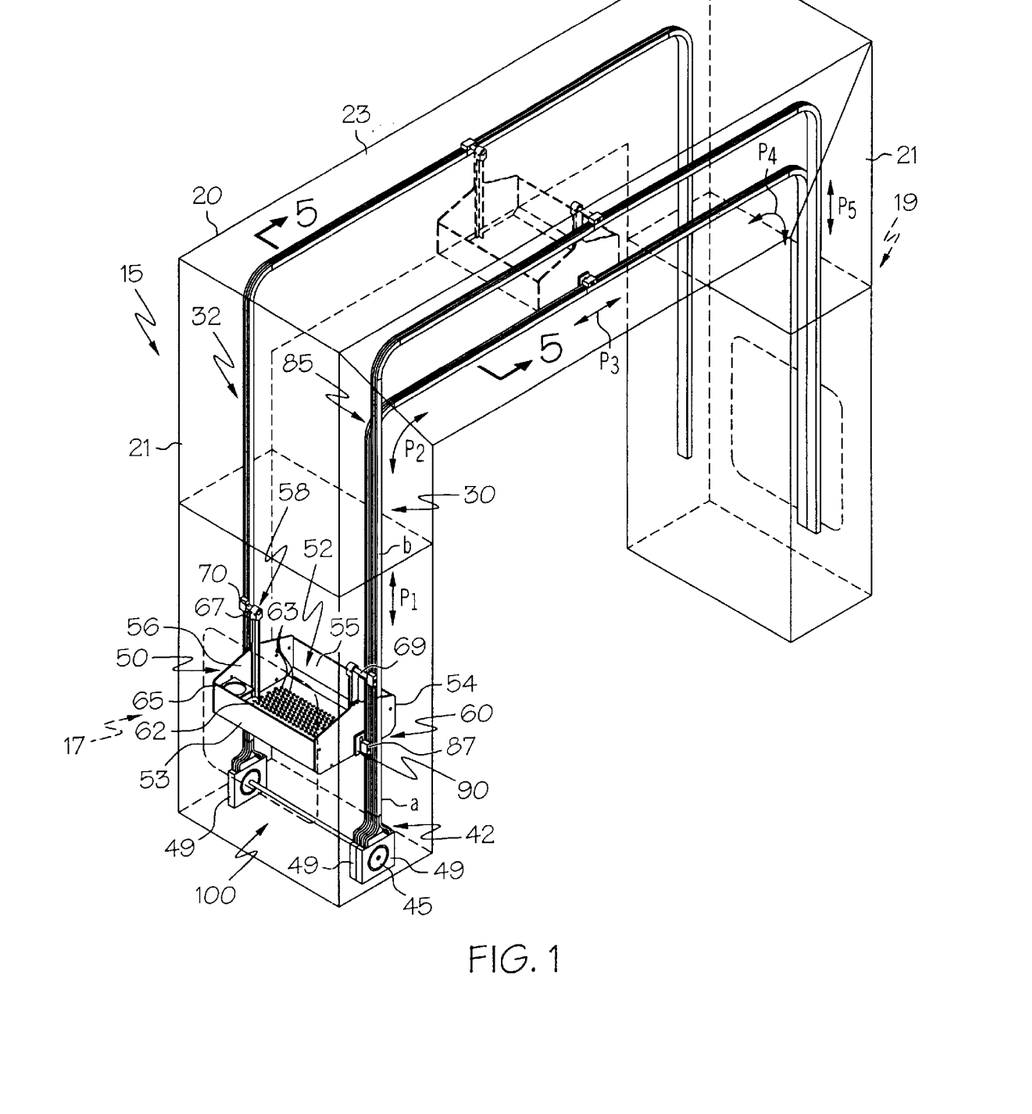
FIG. 1 is a partial, diagrammatic perspective view of a conveyor system made in accordance with the present invention.

Referring now to the drawings in detail, wherein like numerals indicate the same elements throughout the views, and wherein numerals having the same final two digits indicate corresponding elements among various embodiments, FIG. 1 illustrates a diagrammatic perspective of an exemplary conveyor system 15 made in accordance with the present invention. This embodiment is illustrated as including a processing station 17 which might be situated adjacent the kitchen of a restaurant or similar remote transaction processing portion of a business, for delivery of drive-through orders. A remote delivery or transaction station 19 is illustrated adjacent the far end of conveyor system 15, and a housing 20 exemplifies an enclosure which might surround all or a portion of such a conveyor system, as desired. Such housing might include portions of a building or related structures, or a specific conveyor system enclosure structure.

Housing 20 is similarly illustrated as including vertical portions 21 and horizontal portions 23, within which the conveyor system operates to translate items to be delivered between the stations.

Figure 2:
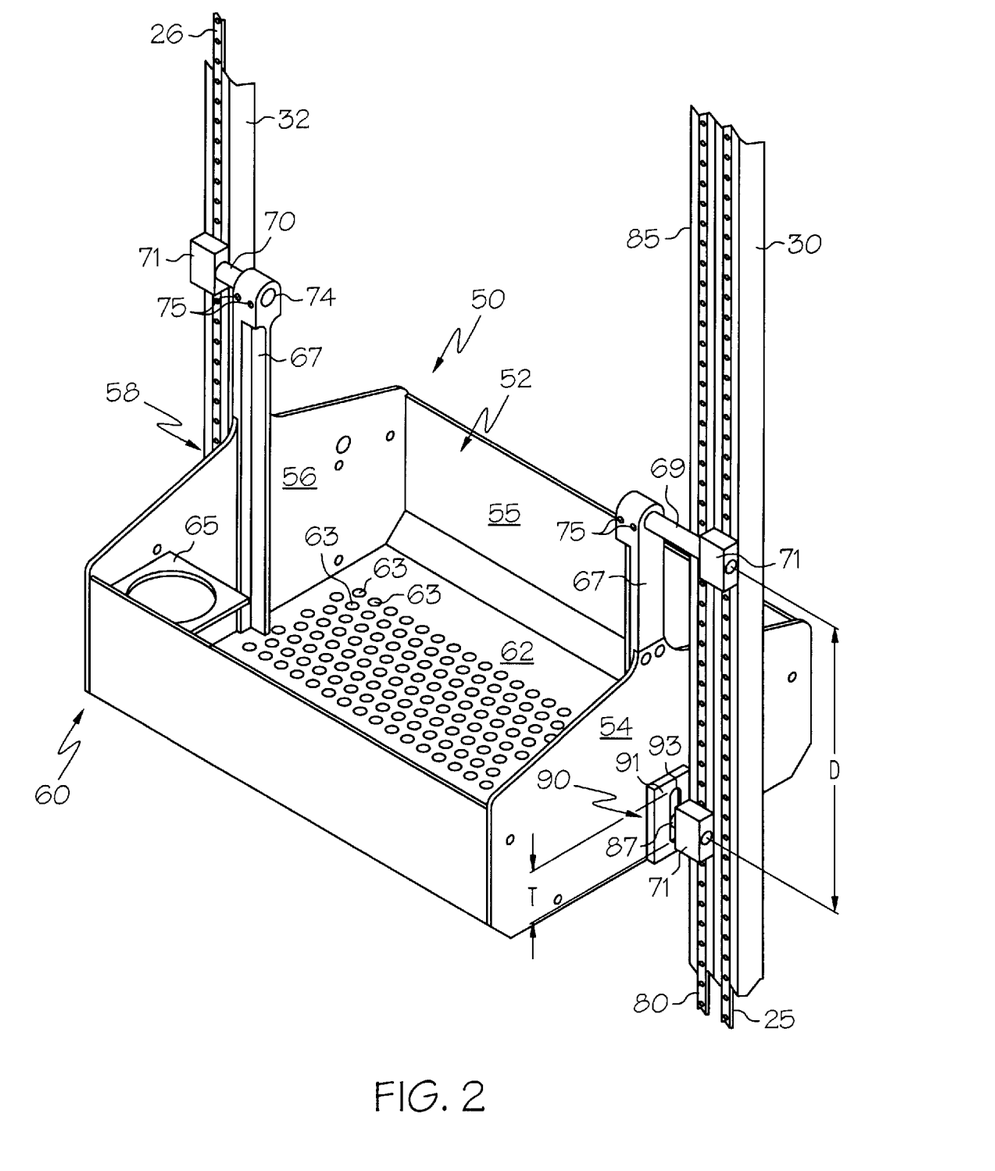
FIG. 2 is a partial, enlarged view of the carrier and guide tracks of the conveyor system of FIG. 1.
Figure 3:
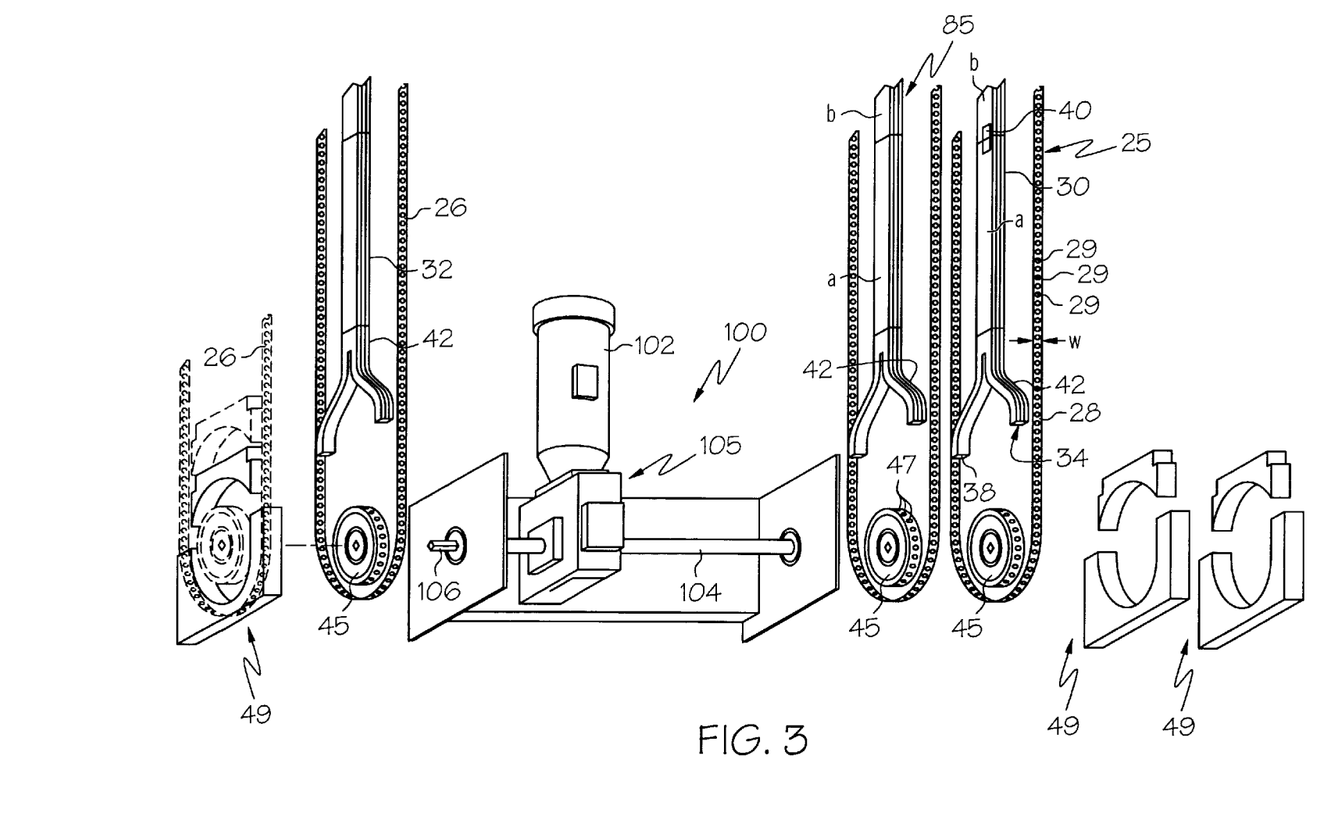
FIG. 3 is a partial, enlarged, and partially exploded illustration of drive members, guide members and a drive assembly of an exemplary embodiment of a conveyor system made in accordance with the present invention.
Figure 4:
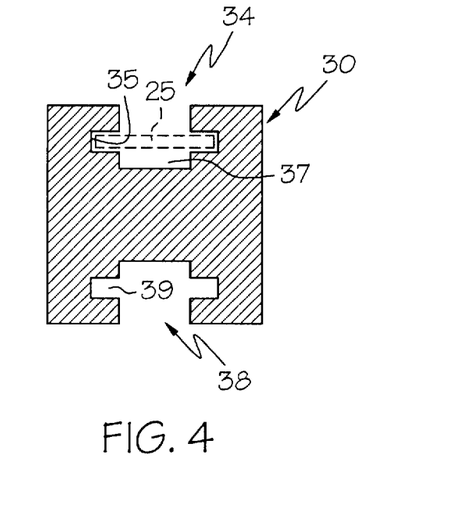
FIG. 4 is an enlarged cross section of an exemplary guide track section which can be utilized in an embodiment of the present invention.

Further details of exemplary structures which can be implemented in an embodiment of the present invention are shown in FIGS. 2–4. Particularly, conveyor system 15 is contemplated as including a pair of flexible drive members 25 and 26. As indicated above, the drive members of a conveyor system made in accordance with the present invention can be provided in a variety of forms. As also mentioned the examples discussed herein are described with an exemplary flexible drive tape (e.g., 28) which can be provided as a flexible yet relatively longitudinally rigid perforated tape (such as available under the name "Dymetrol" from E. I. Dupont of Fayetteville, N.C. having a plurality of uniformly spaced perforations 29 along its longitudinal length. Such a drive member may be advantageous in applications where the drive member can provide reciprocating longitudinal force as a result of the longitudinal rigidity of the tape, yet easily change vertical and horizontal directions as a result of the flexibility in a direction generally normal to its length and traverse width (W).

As best seen in FIGS. 1 and 3, a pair of spaced apart drive guides 30 and 32, respectively, are each positioned to define a path of travel (generally illustrated as path $P_1$, $P_2$, $P_3$, $P_4$ and $P_5$) for a corresponding drive member (e.g., drive member 25) between processing station 17 and remote delivery station 19. The paths of travel for drive members 25 and 26 would generally be correspondingly parallel with one another. The drive guides (e.g., 30) are illustrated in FIG. 4 as including a recess 34 providing a slot or drive channel 35 for receiving and guiding a drive member (e.g., 25, 26) as it is reciprocated therewithin. A connection clearance space 37 is also provided in recess 34 to facilitate connection of the drive member to a carrier member, as will be described. The drive guide may also include a return guide receptor 38 including a drive member storage channel 39 for collecting portions of the drive member not currently being utilized to reciprocate a carrier member.

While FIG. 4 illustrates drive guide 30 as a single piece or unitary structure, it should be understood that the structural details of the flexible drive members and the specifics of the drive guides therefore are not critical to the invention, and can be provided in a variety of forms. For example, drive guide 30 might be provided in a multi-piece arrangement. Even if the drive guide itself is provided a one-piece device, such as an extrusion, such as might be provided from Delrin or other plastic material, a number of preformed lengths of the drive guide (as shown as parts a and b in FIGS. 1 and 3) can be provided to enable building of custom systems from modular parts. In this way, lengths of the drive guide might be provided in various shapes and sizes, and connected in any convenient way such as by guide track connection 40 comprising an overlapping plate with machine screws or bolts holding adjacent sections together.

As will be understood by those of ordinary skill in the industry, the flexible drive member (e.g., 25, 26) is wrapped around a substantial portion of the periphery of cog wheel (e.g., 45) for providing both push and pull driving power for the conveyor system. The cog wheel or driven member 45 would be rotatably mounted for driving communication with a power drive (e.g., 100) which will be described further below. As set forth in U.S. Pat. No. 5,232,408, the disclosure of which being hereby incorporated herein by reference, the cog wheel 45 would be rotatably housed within a surround 49, whereby the flexible drive member (e.g., 25) would be fed into the surround to maintain an interlocking relationship between lugs or teeth 47 of the cog wheel and the perforations 29 of the tape within the surround. Shaped surround guide track adaptors (e.g., 42) can also be provided to smoothly feed the flexible drive member in alignment with the multi-piece surround 49 and the driven cog wheel 45.

As seen best in FIGS. 1 and 2, a carrier member 50 is provided with an item receiving portion or generally open receptacle 52 defined by oppositely disposed sidewalls 53–56. Carrier member 50 is illustrated as a generally opened basket-like device having a supporting surface or bottom 62, with a plurality of apertures to reduce weight and facilitate cleaning procedures as needed. It is contemplated that carrier member 50 might be constructed of a rigid high-impact plastic, lightweight aluminum, or other material of sufficient strength and durability such as alloys, carbon fiber or the like.

Carrier member 50 is further illustrated as generally including an upper end 58 and a lower end 60 spaced along a vertical axis from the upper end, and a pair of oppositely disposed, upwardly extending carrier supports 67. While it should be understood that the carrier member of the present invention can take any variety of shapes and forms, including enclosed or partially enclosed structures, for many remote delivery applications it will be desirable to have a generally open carrier having a generally basket-like form to receive a wide variety and sufficient volume of items to be delivered. For special applications, it might be desirable to include one or more fixtures such as the cup holder 65 shown in the FIG. 2. It will be understood that such fixtures might also include dividers, multiple levels of storage, tiered arrangements, loose item containers or the like. For the generally rectangular basket-like example shown in these drawings, carrier supports 67 are illustrated as being attached adjacent oppositely disposed end walls 54 and 56, respectively. The carrier support 67 can help rigidify the carrier member itself, and each are shown as being fitted with a carrier journal (69 and 70) adjacent their upper ends. Bores 74 for receiving the respective carrier journals 69, 70, can be fastened therewithin such as by set screws 75. The carrier journal (e.g., 69) provides an effective axle for the carrier member adjacent its upper end 58. The carrier journals 69 and 70 might also be provided with a flat (not shown) adjacent their inner ends attached to the carrier support to allow for adjustments to accommodate for varying widths and tolerances of the carrier supports 67, and to facilitate securement of the axle to the carrier member, such as by the set screws 75. As will be understood, such an arrangement provides the carrier member 50 with a pair of aligned axles adjacent its upper end 58 to allow the carrier member some freedom of rotation as it is reciprocated between spaced stations.

Carrier journal 69 extends outwardly and its rotatably received within a journal bearing or tape block 71 which can be made from a natural bearing-like material such as ultra-high molecular weight (UHMW) plastic. By providing tape block 71 which allows for rotational movement of carrier journal 69, the carrier member's freedom to rotate is maintained even after the secure attachment of the tape block 71 to the flexible drive member (e.g., 25). A similar tape block 71 is provided for attachment of the carrier journal 70 on the other side of the carrier member to the second flexible drive member (e.g., 26). Any appropriate drive connector 72 (which will be more easily seen with reference to FIG. 6, discussed below) can be utilized, such as rivets, bolts or the like.

In addition to the pair of flexible drive members 25 and 26 connected to the carrier member, a third flexible stabilization drive member 80 is similarly provided as part of conveyor system 15, and includes a corresponding stabilization drive guide 85 positioned to define a third path of travel for the stabilization drive member. That stabilization drive member path of travel generally follows at least one of the carrier member drive members (i.e., the path of travel $P_1$–$P_5$ described above with respect to drive members 25 and 26), as best seen in FIG. 1. As will be understood, the stabilization drive member 80 provides active and driven stabilization to carrier member 50 as it is translated between stations. Consequently, it will also be understood that the path of travel of the stabilization drive member will be spaced from but will generally need to follow or correspond to the path of travel of one or both of the flexible drive members (e.g., 25 and 26) in order to maintain carrier member 50 in a predetermined general orientation (e.g., generally upright) and to facilitate smooth and stable translation of the carrier member along vertical, horizontal, and curved or transitioned portions of the system.

Similar to the arrangements discussed above, stabilization drive guide 85 can be provided in essentially identical form, having a drive guide conformation and structural arrangement as described above with respect to drive guide 30 and FIG. 4. Stabilization drive member 80 is similarly driven by a cog or driven wheel 45 situated in a surround 49 as described above. Correspondingly, there is provided a stabilization journal 87 attached to stabilization drive member 80 via a tape block 71 as described above.

It is contemplated that the stabilization journal 87 will advantageously be attached or otherwise connected to carrier member 50 relative to one of the drive member carrier journals (e.g., 69 or 70), and spaced therefrom at a distance D. It has also been found that larger distances D, as opposed to smaller distances, are better for providing additional stabilization of the carrier member in translation. For example, shorter distances D may tend to allow for more "brittle" or sensitive arrangements due to the shorter "lever" created between these respective points of attachment. Consequently, it may be preferred to attach the stabilization journal adjacent to the lower end of carrier member 50 if the carrier journals are attached adjacent the upper end. Similarly, if the carrier journals were attached closer to the lower end of the carrier member (as will be described below with respect to FIG. 7), it might be more advantageous to locate the stabilization journal adjacent the upper end to provide for a greater distance D.

As will be appreciated by those skilled in the art, although the stabilization drive guide will be adapted and arranged so as to generally follow or correspond to the path of at least one of the carrier member flexible drive members, as discussed above, where the conveyor system (e.g., 15) has one or more transitions or curves between substantially vertical and substantially horizontal portions, there will often be variations of spacing between the guide track and/or the respective rotatable journals. There may also be some variations among the lengths of the respective drive members, their perforations, and/or the connections between the journals and the drive members themselves. Those variations can cause rocking and/or allow other unsettling and extraneous forces to act upon the carrier member which can cause roughness of the translation of the items, spillage, and/or undesired disruption of the stability of the system. This can be especially true at higher speeds where the momentum of the carrier member and its contents around transitions and curves can combine with such variations to cause or exacerbate problems. Maintaining a predetermined general orientation regardless of operation speed and/or variations in the direction of-the path of travel, in a stable manner, obviates these concerns.

Figure 5:
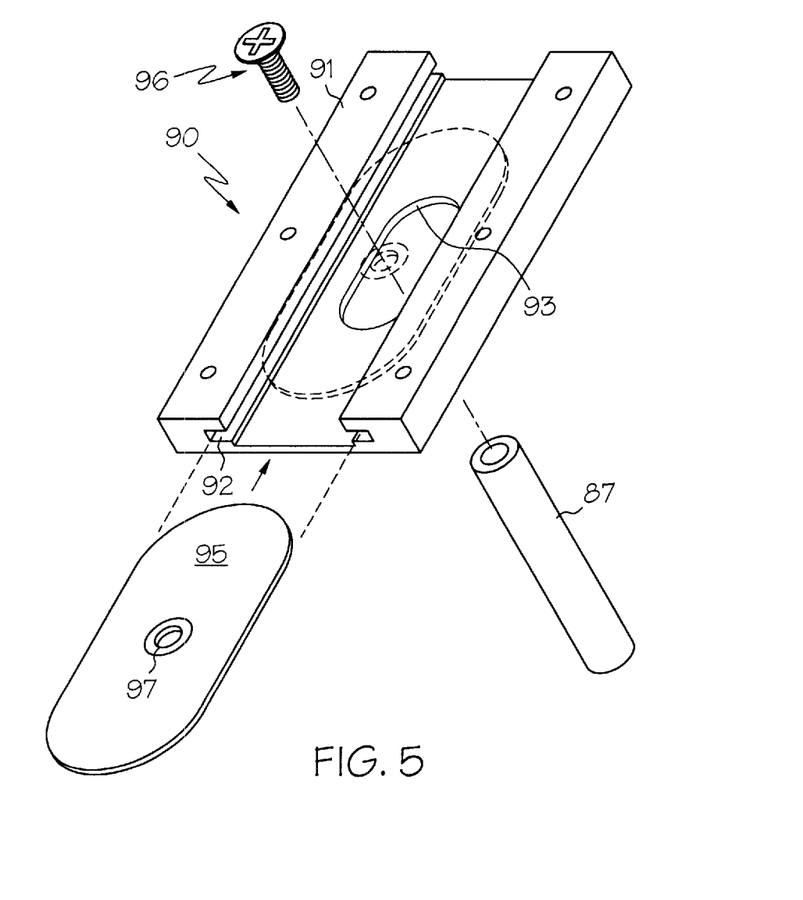
FIG. 5 is an enlarged, exploded perspective view of an exemplary adjustable mount arrangement which can utilized with a conveyor system made in accordance herewith.

In the present invention, there can be provided an adjustable mount 90 as seen best in FIGS. 2 and 5, wherein the stabilization connection point (i.e., the connection between stabilization drive member 85 and carrier 50) is provided with a predetermined range of adjustability. In the example illustrated in the drawings, adjustable mount 90 comprises a slotted bracket 91, which can be made of plastic material and includes a longitudinal slot 92 and an adjustment aperture 93 formed in its front face. A generally obround slide plate 95 having a press fit opening 97 formed therein would be slidably inserted into longitudinal slot 92, such that its press fit opening 97 is generally aligned with adjustment aperture 93. Thereafter, an axle stud 96 might be press fit into opening 97 and through aperture 93 from the rear as indicated in FIG. 5, and thereafter the stabilization axle or journal 87 can be attached to stud 96. Adjustable mount can then be attached to the exterior surface of the side wall 54 of carrier member 50 (e.g., see FIG. 2).

As mentioned above, stabilization journal 87 would then be rotatably received within journal bearing or tape block 71 and attached to stabilization drive member 80 by an appropriate fastening arrangement.

The slide plate 95 with its attached stabilization journal 87 can move within the adjustable mount 90 a predetermined limit of travel T in accordance with the relative sizing of adjustment aperture 93. As will be understood, this limited amount of movement T allows the stabilization journal 87 to automatically adjust to variations in the distance D between the respective journals 69 and 87 in use. In this way, unwanted binding or relative "cocking" of the carrier member of a result of slight variations in the effective distance D in use can be automatically and immediately nulled out of the system, thereby maintaining the present orientation of the carrier member regardless of the path of travel of the drive members.

It has also been found that, while manufacturing tolerances and assembly matching of perforated drive tapes in new systems can minimize variations of pitch, spacing, or other anomalies of the flexible drive members, wear, field maintenance, replacement of drive tapes, weather changes, and other variables can increase the sensitivity of conveyor systems utilizing flexible drive members over time. The adjustable mount arrangement of the present invention, however, obviates the many of the ill effects of these variations by automatically compensating for distance D variations resulting therefrom. Because the travel T is limited in both quantity and direction, overall stability of the system is maintained without a need for initial or periodic "tuning" of deflectors or other passive stabilization mechanisms, and regardless of speed of operation.

As also illustrated in FIGS. 1 and 3, the power drive 100 of the conveyor system can be provided adjacent one of the stations, and is shown in FIG. 1 as being adjacent the processing station 17. In order to reciprocate a carrier member between spaced stations, power drive 100 may include a reversible drive assembly, and one or more power sources 102 such as an electric motor would be required. As indicated, it is contemplated that a drive shaft 104 would be provided to drive the cog wheels 45. While independent power sources could be provided for each of the cog wheels 45, in a relatively simple embodiment, the reversible drive assembly of power drive 100 would be provided with a drive shaft 104 in driving communication with all three of the driven members (e.g. cog wheels 45) for simultaneous driving procedures. If multiple power drives are to be provided, the individual drive members and stabilization drive member 80 should be driven synchronously in order to ensure proper following of the carrier by the powered stabilization arrangement such that carrier member 50 is translated between stations in a most stable and smooth manner. It is also contemplated that an adjustment damper, such as a friction fit of the slide plate within bracket 91, proper choice of materials of the bracket and slide plate, oil film damper, and/or other appropriate damping arrangement, might be included to appropriately dampen the adjustment movement provided by adjustable mount 90. While such damping may generally not be required, in high-speed or high-capacity operations, damping may be advantageous.

As seen in FIG. 3, it is also contemplated that drive shaft 104 might be provided with a polygonal portion (e.g., hexagonal) 106 which might be received in a correspondingly shaped opening of the cog wheels 45. It is also contemplated that it might be desirable to allow one or more of the cog wheels to have at least a limited amount of "float" or freedom to move laterally along the drive shaft in use to compensate for slight variations in the width W or overall alignment of the respective drive members and stabilization drive member as they are reciprocated within the surrounds 49. Of course, the power transmission 105 of the drive assembly could be provided in any form such as a gear box, speed reducer, belt drive or the like.

Figure 6:
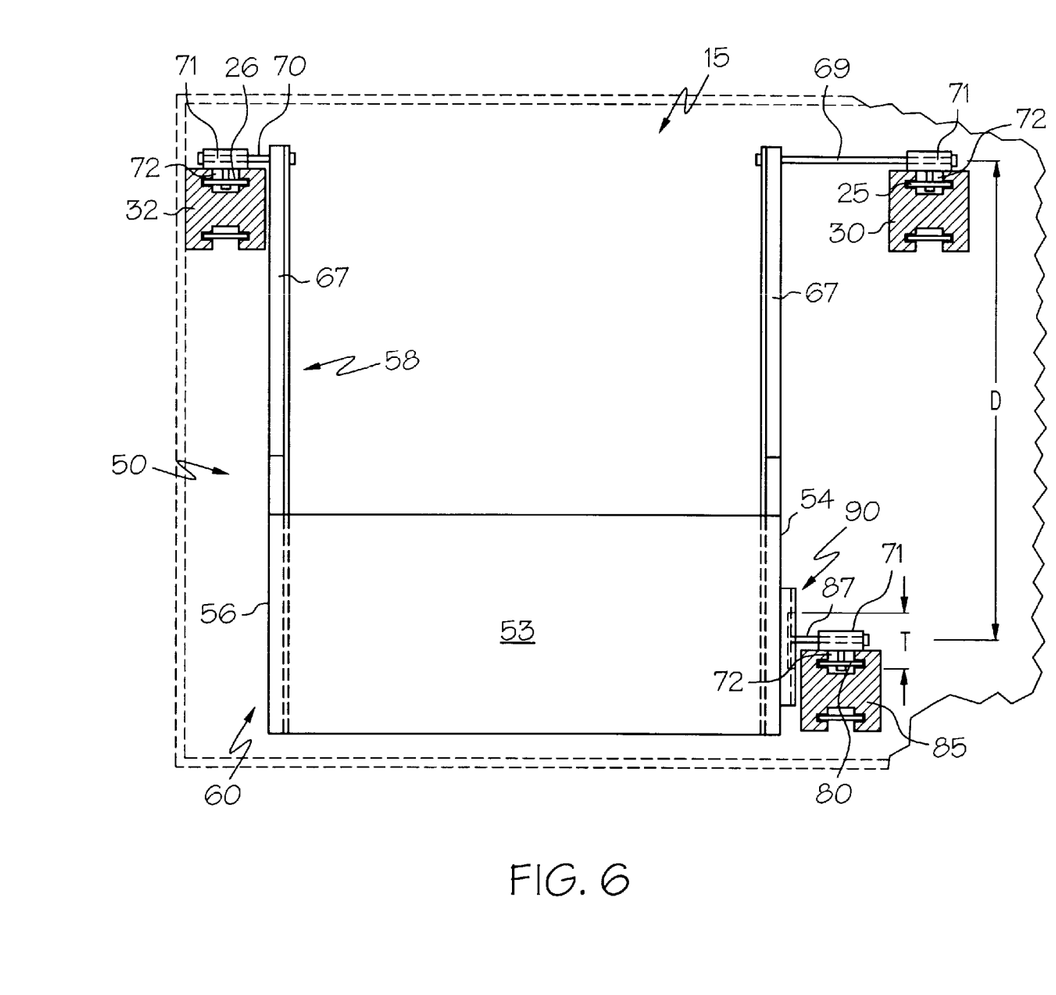
FIG. 6 is a partial, enlarged cross sectional view of the conveyor system of FIG. 1, taken along line 5—5 thereof.

Turning now to FIG. 6, a cross-sectional illustration taken along line 5—5 of FIG. 1 is shown to provide additional understanding and clarity to the embodiments and the overall conveyor system contemplated herein. As will be appreciated, FIG. 6 is an illustration of the carrier member 50 as it would appear while being translated along a generally horizontal portion (e.g., along path of travel $P_3$ of FIG. 1). As will be understood, carrier member 50 will be generally suspended from drive guides 30 and 32, and the tape blocks 71 will provide a sliding interaction along the top surfaces of the drive guides in the particular embodiment of this Figure. Again, stabilization drive member 80 provides active or driven synchronous stabilization to the carrier member 50 through its connection at stabilization journal 87, and the appropriate distance D between the respective carrier journal 69 and stabilization journal 87 will be maintained by automatic adjustment within the limit of travel T. The actual length of the amount of travel T can obviously vary, and can be determined for specific applications and in accordance with the contemplated performance needs of the system.

Figure 7:
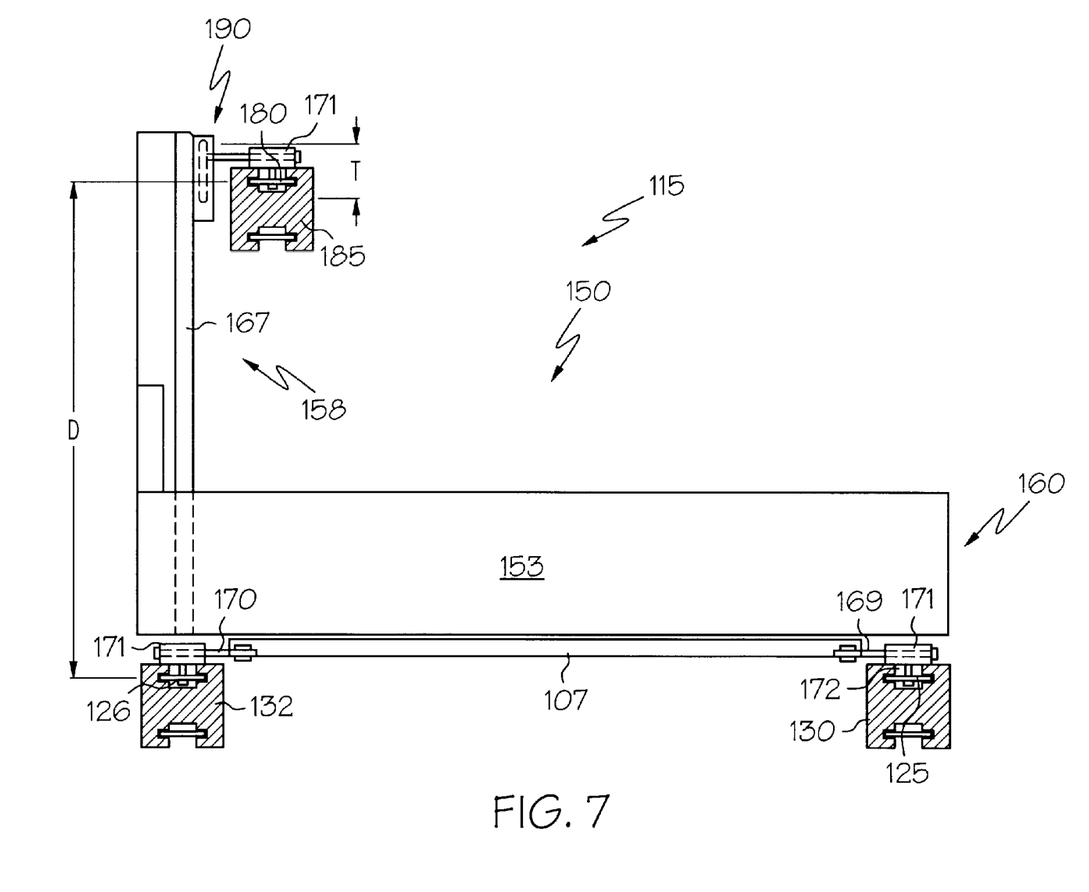
FIG. 7 is a partial, enlarged cross section similar to that of FIG. 6, illustrative of an alternate embodiment of a conveyor system made in accordance herewith.

FIG. 7 shows an illustration similar to that of FIG. 6, however illustrates an alternate embodiment of a conveyor system 115 having a carrier member 150 with only a single carrier support 167. In this embodiment, a mounting platform 107 is provided below carrier member 150, and it is contemplated that platform 107 will be connected to a pair of flexible drive members 125 and 126, respectively, via carrier journals 169 and 170, respectively. Carrier 150 can be attached to platform 107 by any appropriate manner, such as fasteners, welding, adhesives, clips, or the like. As will be understood, the carrier journals, tape blocks 171, and drive connectors 172 correspond with and can be provided as similar structures to those as described above. As can be seen, in this embodiment, the carrier member 150 is attached adjacent its lower end 160 to the flexible drive members 125 and 126. Correspondingly, the carrier member 150 is attached to the third or stabilization drive member 180 adjacent its upper end 158. Adjustable mount 190 again provides for automatic dynamic adjustment of the effective distance D within the adjustment range T, as discussed above. Such an arrangement might be desirable where an even more open carrier member is desired or other limitations of space or peculiarities of the installation can be better accommodated by this alternate arrangement. Carrier support 167 could be located at any location of the carrier to accommodate unique loading requirements and/or spacing limitations for location of stabilization guide 185 above the carrier. Costs and materials might also be minimized in some situations by locating the two drive members adjacent the lower ends of the carrier member.

Having shown and described various embodiments of the present invention, further adaptions of the conveyor system of the present invention as described herein can be accomplished by appropriate modifications by one of ordinary skill in the art without departing from the scope of the present invention. Several of these potential modifications and alternatives have been mentioned, and others will be apparent to those skilled in the art. Accordingly, the scope of the present invention should be considered in terms of the following claims and is understood not be limited to the details of structure, operation or process steps as shown and described in the specification and drawings.

We claim:

1. A conveyor system for delivering items from a processing station to a remote delivery station, said system comprising:
   a pair of flexible drive members;
   a pair of spaced apart drive guides each positioned to define a path of travel for one of said drive members between a processing station and a remote delivery station;
   a carrier member having an item receiving portion and upper and lower ends, said carrier member attached to both of the respective flexible drive members adjacent to one of its upper or lower ends for reciprocation between said stations along said guides; and
   a third flexible stabilization drive member and a corresponding stabilization guide positioned to define a third path of travel for said stabilization drive member, said carrier member attached to said third drive member adjacent to the other of said upper or lower ends.

2. The conveyor system of claim 1, wherein said drive members are attached to said carrier member adjacent its upper end.

3. The conveyor system of claim 1, further comprising a reversible drive assembly operatively connected to said drive members.

4. The conveyor system of claim 3, wherein all three of said flexible drive members are connected to a single reversible drive assembly.

5. The conveyor system of claim 3, said reversible drive assembly further comprising a drive shaft and a plurality of driven members each in driven communication with said drive shaft and one of said drive members or said stabilization drive member.

6. The conveyor system of claim 5, wherein at least one of said driven members is connected to said drive shaft and adapted for slidable movement along at least a portion of the length of said drive shaft in use.

7. The conveyor system of claim 1, further comprising an adjustable mount connecting said stabilization drive member to said carrier member.

8. The conveyor system of claim 7, wherein said adjustable mount is adapted to allow limited movement in use of the connection between said third drive member and said carrier member.

9. The conveyor system of claim 7, wherein said carrier is connected to said stabilization drive member at a predetermined spacing from the connection between at least one of said drive members and the carrier.

10. The conveyor system of claim 9, wherein said adjustable mount is adapted to automatically vary said spacing in use within a limited range.

11. The conveyor system of claim 10, wherein said adjustable mount is adapted to allow movement in only the direction of the spacing between respective connections of the stabilization drive member and a corresponding drive member in use.

12. The conveyor system of claim 1, further comprising at least one power drive to drive said drive members and said stabilization drive member simultaneously.

13. The conveyor system of claim 12, wherein said at least one power drive is adapted to drive said drive members and said stabilization drive member synchronously.

14. The conveyor system of claim 1, wherein said drive members comprise drive tapes.

15. A conveyor system for moving items in a container which can maintain a predetermined orientation between a processing or loading station and a delivery station, said system comprising:
   a pair of flexible drive members;
   a pair of spaced apart drive guides each positioned to define a path of travel for one of said drive members between a processing or loading station and a remote delivery station;
   a carrier member having an item receiving portion and upper and lower ends spaced along a vertical axis, said carrier member attached adjacent to one of its upper or lower ends to each of the respective flexible drive members for reciprocation between said stations along said guides in a predetermined general orientation; and
   a third flexible stabilization drive member attached to said carrier at a location spaced in a direction along said vertical axis from the connection of said drive members, and a corresponding stabilization guide positioned to define a path of travel for said stabilization drive member.

16. The system of claim 15, wherein said stabilization drive member is attached to said carrier adjacent to the other of said upper or lower ends.

17. The system of claim 15, wherein said carrier member is attached to said drive members adjacent its lower end, and is attached to said stabilization drive member adjacent its upper end.

18. The system of claim 15, wherein said carrier member comprises a relatively open basket-like item receiving portion with oppositely disposed upwardly extending end supports.

19. The system of claim 18, wherein said basket-like carrier member is attached to said drive members adjacent the upper portions of said end supports.

20. The conveyor system of claim 19, wherein said adjustable mount is adapted to allow limited relative movement of the connection between said stabilization drive member and said carrier member.

21. The conveyor system of claim 15, further comprising an adjustable mount connecting said stabilization drive member to said carrier member.

22. The conveyor system of claim 20, wherein said carrier is connected to said stabilization drive member at a predetermined spacing from the connection between at least one of said drive members and the carrier.

23. The conveyor system of claim 22, wherein said adjustable mount is adapted to automatically vary said spacing in use within a limited range.

24. The conveyor system of claim 23, wherein said adjustable mount is adapted to allow movement in only the direction of the spacing between respective connections of the stabilization drive member and a corresponding drive member in use.

25. The conveyor system of claim 15, wherein said at least one power drive is adapted to drive said drive members and said stabilization drive member synchronously.

26. The conveyor system of claim 25, further comprising a single power source adapted to drive said drive members and said stabilization drive member simultaneously.

27. A conveyor system for moving items in a container which can maintain a predetermined orientation between a processing or loading station and a delivery station, said system comprising:

a pair of flexible drive members;

a pair of spaced apart drive guides each positioned to define a path of travel for one of said drive members between a processing or loading station and a remote delivery station;

a carrier member having an item receiving portion, oppositely spaced side walls and upper and lower ends, said carrier member attached adjacent to its upper end along each of its opposite side walls to a respective flexible drive member for reciprocation between said stations along said guides in a generally predetermined orientation; and a third flexible stabilization drive member attached to said carrier adjacent the lower end, and a corresponding stabilization guide positioned to define a path of travel for said stabilization drive member which generally follows the path of travel of at least one of said drive members.

28. The conveyor system of claim 27, further comprising an adjustable mount connecting said stabilization drive member to said carrier member.

29. The conveyor system of claim 28, wherein said adjustable mount is adapted to allow limited movement of the connection between said third drive member and said carrier member.

30. The conveyor system of claim 29, wherein said carrier is connected to said stabilization drive member at a predetermined spacing from the connection between at least one of said drive members and the carrier.

31. The conveyor system of claim 30, wherein said adjustable mount is adapted to automatically vary said spacing in use within a limited range.

32. The conveyor system of claim 31, wherein said adjustable mount is adapted to allow movement in only the direction of the spacing between the stabilization drive member and the followed drive member in use.

* * * * *